United States Patent
Clay

(10) Patent No.: US 10,070,092 B2
(45) Date of Patent: Sep. 4, 2018

(54) DIRECTIONAL REMOTE CONTROL BASED ON RANGING

(71) Applicant: Sony Corporation, Tokyo (JP)

(72) Inventor: William Clay, San Diego, CA (US)

(73) Assignee: Sony Corporation, Tokyo (JP)

( * ) Notice: Subject to any disclaimer, the term of this patent is extended or adjusted under 35 U.S.C. 154(b) by 143 days.

(21) Appl. No.: 15/217,321

(22) Filed: Jul. 22, 2016

(65) Prior Publication Data

US 2018/0027203 A1    Jan. 25, 2018

(51) Int. Cl.
*H04N 5/44* (2011.01)
*G06F 3/0346* (2013.01)

(52) U.S. Cl.
CPC ......... *H04N 5/4403* (2013.01); *G06F 3/0346* (2013.01); *H04N 2005/4405* (2013.01)

(58) Field of Classification Search
CPC ......... H04N 5/4403; H04N 2005/4405; H04B 5/02; H04B 5/0031; H04B 5/0037; G06F 3/0346; G06K 7/10366; G06K 7/10316; G06K 7/10356; G06K 7/10297; G06K 7/10396

USPC .............................. 340/12.5, 10.41; 348/734
See application file for complete search history.

(56) References Cited

U.S. PATENT DOCUMENTS

| 7,733,229 | B2* | 6/2010 | Reunamaki | G06K 7/0008 340/572.1 |
| 9,344,436 | B1* | 5/2016 | Sheng | H04W 4/021 |
| 9,824,248 | B2* | 11/2017 | Sheng | G06K 7/10396 |
| 2007/0057773 | A1* | 3/2007 | Hsieh | H04B 5/02 340/10.41 |
| 2017/0200033 | A1* | 7/2017 | Li | G06K 7/10366 |

* cited by examiner

*Primary Examiner* — Ali Neyzari
(74) *Attorney, Agent, or Firm* — John L. Rogitz

(57) ABSTRACT

A remote control (RC) has two ultra-wideband tags arranged along the axis of the RC at a known distance "d" from each other. An appliance to be controlled can use a UWB anchor to ping the tags and determine the distance to each tag. The distances are then subtracted and if the difference substantially equals the known distance "d", this represents an indication that the RC is pointed directly at the appliance, and the appliance accordingly will execute commands from the RC. Otherwise, the appliance ignores the RC commands.

18 Claims, 3 Drawing Sheets

Description

Description

DIRECTIONAL REMOTE CONTROL BASED ON RANGING

FIELD

This patent application relates generally to directional remote control of appliances based on ranging.

BACKGROUND

A single remote control or remote commander (collectively, RC) can be used to control multiple appliances, such as TVs, set-top boxes, disk players, etc. As understood herein, it is sometimes problematic for an appliance to discriminate whether an incoming RC signal is meant for it, or for some other appliance nearby.

SUMMARY

Accordingly, an apparatus includes at least one computer memory that is not a transitory signal and that in turn includes instructions executable by at least one processor to transmit a wireless interrogation signal to a companion device. The instructions are executable to receive one or more responses to the interrogation signal from the companion device and based on the one or more responses, to determine at least first and second distances. Further, the instructions are executable to determine a difference between the first and second distances, compare the difference to a known distance, and based on the compare, generate one of two binary outputs.

In examples, responsive to the compare indicating that the difference equals the known distance, the instructions are executable to output a first binary output. The first binary output may be to execute a command from the RC. In some embodiments, the compare can be determined to indicate that the difference equals the known distance responsive to the difference being within a threshold range of the known distance.

In example implementations, responsive to the compare indicating that the difference does not equal the known distance, the instructions are executable to output a second binary output. The second binary output can be to not execute a command from the RC. The compare may be determined to indicate that the difference does not equal the known distance responsive to the difference not being within a threshold range of the known distance.

In example embodiments, the known distance is a distance between first and second wireless tags disposed on a remote control (RC). The tags may be UWB tags and if desired the tags can be arranged in a line parallel to a longitudinal axis of the RC.

In some implementations, the apparatus is an appliance to be controlled and the companion device is a remote control (RC) configured to send wireless commands to control the appliance. In other implementations, the companion device is an appliance to be controlled and the apparatus is a remote control (RC) configured to send wireless commands to control the appliance.

In another aspect, a remote control (RC) has a housing defining a longitudinal axis and at least first and second wireless elements arranged on the housing parallel to the longitudinal axis and configured to respond automatically to wireless pings received from an electronic appliance.

In another aspect, an appliance includes at least one processor configured for presenting on a video display demanded images, and at least one computer memory accessible to the at least one processor and including instructions executable for causing a ping to be transmitted to a remote control (RC) that is configured to send wireless commands to the appliance to control the appliance. The instructions are executable for receiving first and second responses to the ping from respective first and second modules on the RC, using the first and second responses to determine first and second distances, and determining a difference between the distances. The instructions are further executable for comparing the difference to a known spacing between the modules of the RC. Responsive to determining that the difference satisfies a test when compared to the known spacing, the instructions are executable for configuring the appliance to execute commands from the RC. In contrast, responsive to determining that the difference does not satisfy the test when compared to the known spacing, the instructions are executable for not configuring the appliance to execute commands from the RC.

The details of the present application, both as to its structure and operation, can best be understood in reference to the accompanying drawings, in which like reference numerals refer to like parts, and in which:

DETAILED DESCRIPTION

Figure 1:
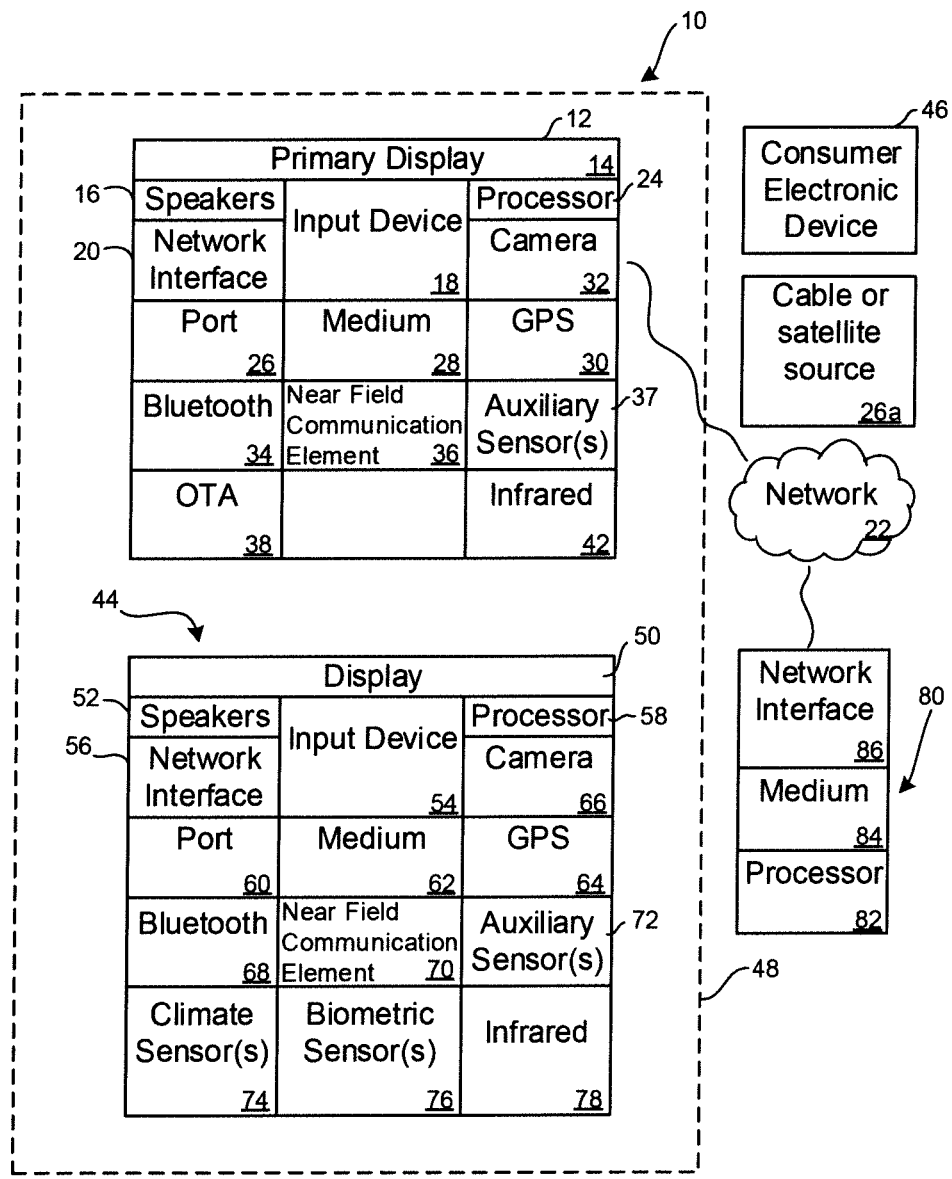
FIG. 1 is a block diagram of an example system including an example in accordance with present principles.

This disclosure relates generally to computer ecosystems including aspects of computer networks that may include consumer electronics (CE) devices. A system herein may include server and client components, connected over a network such that data may be exchanged between the client and server components. The client components may include one or more computing devices including portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, operating systems from Microsoft, or a Unix operating system, or operating systems produced by Apple Computer or Google. These operating environments may be used to execute one or more browsing programs, such as a browser made by Microsoft or Google or Mozilla or other browser program that can access websites hosted by the Internet servers discussed below.

Servers and/or gateways may include one or more processors executing instructions that configure the servers to receive and transmit data over a network such as the Internet. Or, a client and server can be connected over a local intranet or a virtual private network. A server or controller may be instantiated by a game console such as a Sony Playstation (trademarked), a personal computer, etc.

Information may be exchanged over a network between the clients and servers. To this end and for security, servers and/or clients can include firewalls, load balancers, temporary storages, and proxies, and other network infrastructure for reliability and security.

As used herein, instructions refer to computer-implemented steps for processing information in the system. Instructions can be implemented in software, firmware or hardware and include any type of programmed step undertaken by components of the system.

A processor may be any conventional general purpose single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits described below can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hardwired cables including fiber optics and coaxial wires and digital subscriber line (DSL) and twisted pair wires.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example ecosystem 10 is shown, which may include one or more of the example devices mentioned above and described further below in accordance with present principles. The first of the example devices included in the system 10 is a consumer electronics (CE) device configured as an example primary display device, and in the embodiment shown is an audio video display device (AVDD) 12 such as but not limited to an Internet-enabled TV with a TV tuner (equivalently, set top box controlling a TV). The AVDD 12 may be an Android®-based system. The AVDD 12 alternatively may also be a computerized Internet enabled ("smart") telephone, a tablet computer, a notebook computer, a wearable computerized device such as e.g. computerized Internet-enabled watch, a computerized Internet-enabled bracelet, other computerized Internet-enabled devices, a computerized Internet-enabled music player, computerized Internet-enabled head phones, a computerized Internet-enabled implantable device such as an implantable skin device, etc. Regardless, it is to be understood that the AVDD 12 and/or other computers described herein is configured to undertake present principles (e.g. communicate with other CE devices to undertake present principles, execute the logic described herein, and perform any other functions and/or operations described herein).

Accordingly, to undertake such principles the AVDD 12 can be established by some or all of the components shown in FIG. 1. For example, the AVDD 12 can include one or more displays 14 that may be implemented by a high definition or ultra-high definition "4K" or higher flat screen and that may or may not be touch-enabled for receiving user input signals via touches on the display. Present principles are particularly useful for the circumstance in which the display 14 is not touch-enabled. The AVDD 12 may include one or more speakers 16 for outputting audio in accordance with present principles, and at least one additional input device 18 such as e.g. an audio receiver/microphone for e.g. entering audible commands to the AVDD 12 to control the AVDD 12. The example AVDD 12 may also include one or more network interfaces 20 for communication over at least one network 22 such as the Internet, a WAN, a LAN, a PAN etc. under control of one or more processors 24. Thus, the interface 20 may be, without limitation, a Wi-Fi transceiver, which is an example of a wireless computer network interface, such as but not limited to a mesh network transceiver. The interface 20 may be, without limitation a Bluetooth transceiver, Zigbee transceiver, IrDA transceiver, Wireless USB transceiver, wired USB, wired LAN, Powerline or MoCA. It is to be understood that the processor 24 controls the AVDD 12 to undertake present principles, including the other elements of the AVDD 12 described herein such as e.g. controlling the display 14 to present images thereon and receiving input therefrom. Furthermore, note the network interface 20 may be, e.g., a wired or wireless modem or router, or other appropriate interface such as, e.g., a wireless telephony transceiver, or Wi-Fi transceiver as mentioned above, etc.

In addition to the foregoing, the AVDD 12 may also include one or more input ports 26 such as, e.g., a high definition multimedia interface (HDMI) port or a USB port to physically connect (e.g. using a wired connection) to another CE device and/or a headphone port to connect headphones to the AVDD 12 for presentation of audio from the AVDD 12 to a user through the headphones. For example, the input port 26 may be connected via wire or wirelessly to a cable or satellite source 26a of audio video content. Thus, the source 26a may be, e.g., a separate or integrated set top box, or a satellite receiver. Or, the source 26a may be a game console or disk player containing content that might be regarded by a user as a favorite for channel assignation purposes described further below.

The AVDD 12 may further include one or more computer memories 28 such as disk-based or solid state storage that are not transitory signals, in some cases embodied in the chassis of the AVDD as standalone devices or as a personal video recording device (PVR) or video disk player either internal or external to the chassis of the AVDD for playing back AV programs or as removable memory media. Also in some embodiments, the AVDD 12 can include a position or location receiver such as but not limited to a cellphone receiver, GPS receiver and/or altimeter 30 that is configured to e.g. receive geographic position information from at least one satellite or cellphone tower and provide the information to the processor 24 and/or determine an altitude at which the AVDD 12 is disposed in conjunction with the processor 24. However, it is to be understood that that another suitable position receiver other than a cellphone receiver, GPS receiver and/or altimeter may be used in accordance with present principles to e.g. determine the location of the AVDD 12 in e.g. all three dimensions.

Continuing the description of the AVDD 12, in some embodiments the AVDD 12 may include one or more cameras 32 that may be, e.g., a thermal imaging camera, a digital camera such as a webcam, and/or a camera integrated into the AVDD 12 and controllable by the processor 24 to gather pictures/images and/or video in accordance with present principles. Also included on the AVDD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVDD 12 may include one or more auxiliary sensors 37 (e.g., a motion sensor such as an accelerometer, gyroscope, cyclometer, or a magnetic sensor, an infrared (IR) sensor for receiving IR commands from a remote control, an optical sensor, a speed and/or cadence sensor, a gesture sensor (e.g. for sensing gesture command), etc.) providing input to the processor 24. The AVDD 12 may include an over-the-air TV broadcast port 38 for receiving OTA TV broadcasts providing input to the processor 24. In addition to the foregoing, it is noted that the AVDD 12 may also include an infrared (IR) transmitter and/or IR receiver and/or IR transceiver 42 such as an IR data association (IRDA) device. A battery (not shown) may be provided for powering the AVDD 12.

Still referring to FIG. 1, in addition to the AVDD 12, the system 10 may include one or more other computer device types that may include some or all of the components shown for the AVDD 12. In one example, a first device 44 and a second device 46 are shown and may include similar components as some or all of the components of the AVDD 12. Fewer or greater devices may be used than shown.

In the example shown, to illustrate present principles all three devices 12, 44, 46 are assumed to be members of a local network in, e.g., a dwelling 48, illustrated by dashed lines.

The example non-limiting first device 44 may include one or more touch-sensitive surfaces 50 such as a touch-enabled video display for receiving user input signals via touches on the display. The first device 44 may include one or more speakers 52 for outputting audio in accordance with present principles, and at least one additional input device 54 such as e.g. an audio receiver/microphone for e.g. entering audible commands to the first device 44 to control the device 44. The example first device 44 may also include one or more network interfaces 56 for communication over the network 22 under control of one or more vehicle processors 58 such as an engine control module (ECM). Thus, the interface 56 may be, without limitation, a Wi-Fi transceiver, which is an example of a wireless computer network interface, including mesh network interfaces. It is to be understood that the processor 58 controls the first device 44 to undertake present principles, including the other elements of the first device 44 described herein such as e.g. controlling the display 50 to present images thereon and receiving input therefrom. Furthermore, note the network interface 56 may be, e.g., a wired or wireless modem or router, or other appropriate interface such as, e.g., a wireless telephony transceiver, or Wi-Fi transceiver as mentioned above, etc.

In addition to the foregoing, the first device 44 may also include one or more input ports 60 such as, e.g., a HDMI port or a USB port to physically connect (e.g. using a wired connection) to another computer device and/or a headphone port to connect headphones to the first device 44 for presentation of audio from the first device 44 to a user through the headphones. The first device 44 may further include one or more tangible computer readable storage medium 62 such as disk-based or solid state storage. Also in some embodiments, the first device 44 can include a position or location receiver such as but not limited to a cellphone and/or GPS receiver and/or altimeter 64 that is configured to e.g. receive geographic position information from at least one satellite and/or cell tower, using triangulation, and provide the information to the device processor 58 and/or determine an altitude at which the first device 44 is disposed in conjunction with the device processor 58. However, it is to be understood that that another suitable position receiver other than a cellphone and/or GPS receiver and/or altimeter may be used in accordance with present principles to e.g. determine the location of the first device 44 in e.g. all three dimensions.

Continuing the description of the first device 44, in some embodiments the first device 44 may include one or more cameras 66 that may be, e.g., a thermal imaging camera, a digital camera such as a webcam, etc. Also included on the first device 44 may be a Bluetooth transceiver 68 and other Near Field Communication (NFC) element 70 for communication with other devices using Bluetooth and/or NFC technology, respectively. An example NFC element can be a radio frequency identification (RFID) element.

Further still, the first device 44 may include one or more auxiliary sensors 72 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the CE device processor 58. The first device 44 may include still other sensors such as e.g. one or more climate sensors 74 (e.g. barometers, humidity sensors, wind sensors, light sensors, temperature sensors, etc.) and/or one or more biometric sensors 76 providing input to the device processor 58. In addition to the foregoing, it is noted that in some embodiments the first device 44 may also include an infrared (IR) transmitter and/or IR receiver and/or IR transceiver 42 such as an IR data association (IRDA) device. A battery may be provided for powering the first device 44. The device 44 may communicate with the AVDD 12 through any of the above-described communication modes and related components.

The second device 46 may include some or all of the components described above.

Now in reference to the afore-mentioned at least one server 80, it includes at least one server processor 82, at least one computer memory 84 such as disk-based or solid state storage, and at least one network interface 86 that, under control of the server processor 82, allows for communication with the other devices of FIG. 1 over the network 22, and indeed may facilitate communication between servers, controllers, and client devices in accordance with present principles. Note that the network interface 86 may be, e.g., a wired or wireless modem or router, Wi-Fi transceiver, or other appropriate interface such as, e.g., a wireless telephony transceiver.

Accordingly, in some embodiments the server 80 may be an Internet server, and may include and perform "cloud" functions such that the devices of the system 10 may access a "cloud" environment via the server 80 in example embodiments. Or, the server 80 may be implemented by a game console or other computer in the same room as the other devices shown in FIG. 1 or nearby.

The TV described below may incorporate some or all of the elements of the AVDD 12 described above. The remote commanders described below may include some or all of the components of the CE device 44 described above in addition to those described below.

Figure 2:
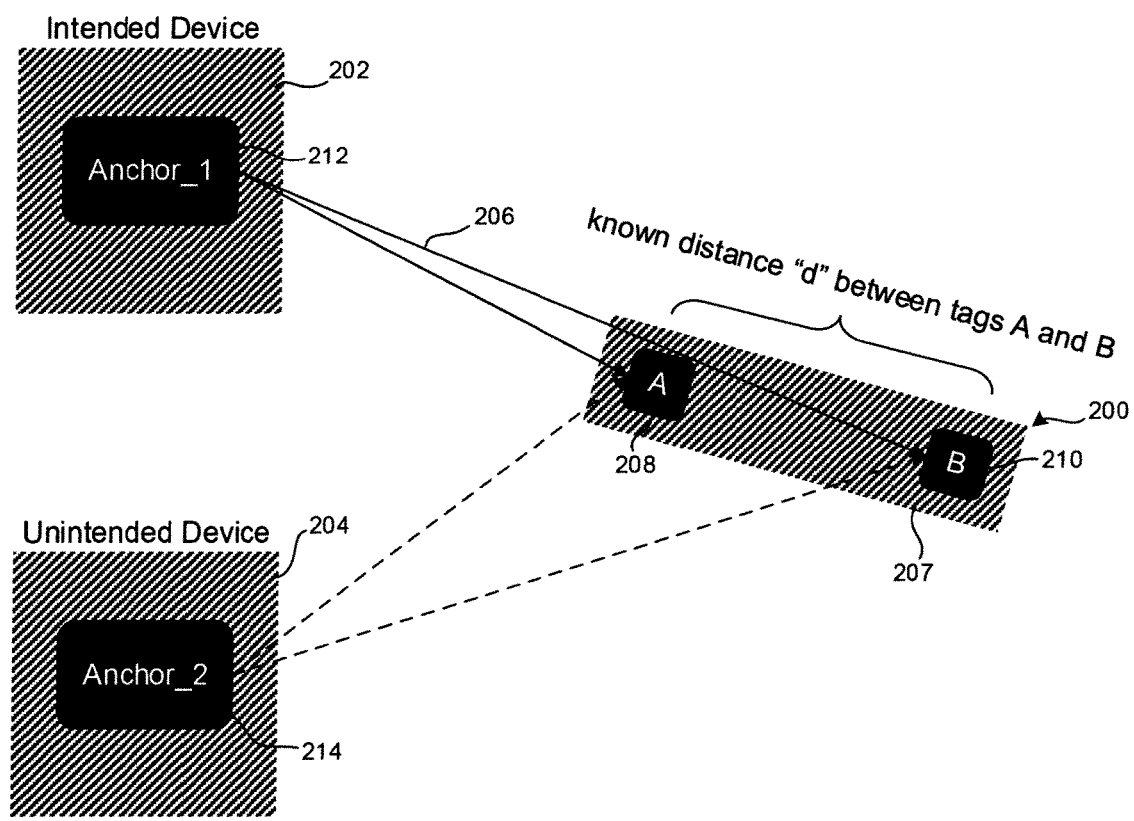
FIG. 2 is a schematic diagram of an example remote control (RC)

FIG. 2 shows remote control (RC) 200 that may be shipped with the AVDD 12 and that can include some or all of the components of the CE device 44 in FIG. 1 as well as the components shown in FIG. 2. As shown in FIG. 2, the RC 200 can be used to control multiple appliances (only first and second appliances 202, 204 shown in FIG. 2 for ease of description). The appliances 202, 204 may be any of the appliances discussed herein and may require the same IR codes for control or may require different IR codes for control. For example, the first appliance 202 may be implemented by the AVDD 12 while the second appliance 204 may be implemented by a cable or satellite receiver or Internet receiver or disk player or other source of content. An appliance herein also may be implemented by a gaming controller, a home automation controller that controls indoor lighting, air conditioning, window coverings, door closures, and the like, and the multiple appliances may be multiple commercial displays in a retail outlet in which the RC 200 is used to control a single monitor at a time in a bank of many monitors.

In the example shown in FIG. 2, the first appliance 202 is labeled "intended device" because it is the device intended to be controlled by the RC 200, which as shown is pointing straight at the "intended device" (i.e., the longitudinal axis 206 of the RC 200 intersects the intended device 202) as a user holding the RC 200 typically orients the RC 200 to control a device intended to be controlled. In contrast, the second appliance 204 is labeled "unintended device". Nonetheless, present principles understand that both appliances 202, 204 may pick up the wireless command signal from the RC 200 owing to spreading of the typically IR or other wireless command signal.

To ensure that only the "intended device" 202 acts on the command signal from the RC 200 and that the "unintended device" does not, even though both appliances receive the signal, attention is drawn to the remainder of FIG. 2 and subsequent figures. As shown, the RC 200 includes on its housing 207 first and second tags 208, 210 which can be wireless modules and which are spaced from each other by a known distance "d" along or parallel to the longitudinal axis 206 of the RC 200. Each appliance 202, 204 includes a respective "anchor" 212, 214 which is a wireless module configured to wirelessly couple with the tags 208, 210 on the RC 200. In an example, the tags 208, 210 and anchors 212, 214 are ultra-wideband (UWB) devices that may operate according to IEEE 802.15.4, although other ranging technologies may be used. UWB, as understood herein, can measure distances between an anchor 212 and each tag 208, 210 using UWB wireless ranging within an accuracy in the centimeter range.

Figure 3:
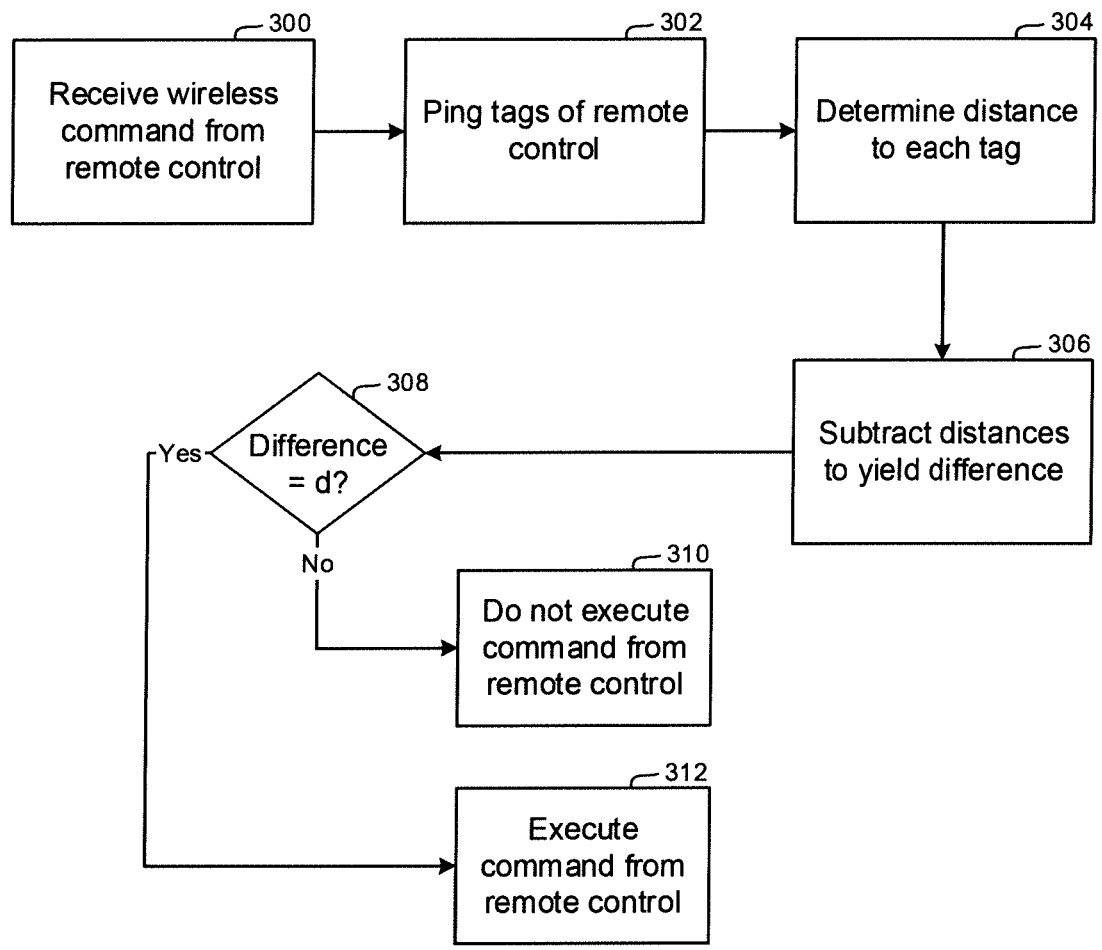
FIG. 3 is a flow chart of example logic according to present principles.

Now referring to FIG. 3 for description of how the hardware in FIG. 2 is used, at block 300 an appliance to be controlled receives a wireless command from the RC 200, typically over IR or RF. Note that in the embodiment of the logic shown in FIG. 3, receipt of the wireless command triggers a ping at block 302 from the appliance's anchor of the tags 208, 210 of the RC 200. In other embodiments, the appliances may ping the tags of the RC 200 periodically, e.g., every few seconds, or on some other ping trigger basis, prior to receiving an RC command.

At block 302, the appliance anchor 212/214 pings the tags 208, 210 of the RC 200 to receive back responses from the tags 208, 210. According to the example UWB technique employed or other ranging technique, the processor of the appliance determines the distance to each tag at block 304. Typically, the distance may be calculated as one half the speed of propagation of the ping signal multiplied by the time period between time of ping transmission and time at which the response from the tag was received. If desired, an empirically determined latency period may be subtracted from the time period between ping and response to account for non-simultaneous transmission of ping response by a tag from the time of ping receipt by the tag.

Proceeding to block 306, the distance from the anchor of the pinging appliance to the first tag 208 is subtracted from the distance from the anchor of the pinging appliance to the second tag 210. Moving to diamond 308, it is determined by the processor of the pinging appliance whether the difference in distances between the tags as measured in blocks 304 and 306 is the same (within a threshold, if desired, such as half centimeter) as the known distance "d" in FIG. 2, which is made available to the processor of the appliance either at manufacture time or as received from the RC during set up.

Responsive to the difference in distances between the tags as measured not equaling the known distance "d" (and, thus, indicating that the RC 200 is not pointed directly at the appliance as is the case shown in FIG. 2 for the "unintended device" 204), the logic moves to block 310 to discard or otherwise ignore the command from the RC received at block 300 without executing the command.

On the other hand, responsive to the difference in distances between the tags as measured equaling the known distance "d" (and, thus, indicating that the RC 200 is pointed directly at the appliance as is the case shown in FIG. 2 for the "intended device" 202), the logic moves to block 312 to execute the command from the RC.

Note that the status of the RC 200 pointing (or not) at a pinging appliance may be communicated from the appliance back to the RC 200. In this way, both the pinging appliance (s) and the RC 200 know which appliance at which the user is pointing the RC. This is particularly useful in embodiments in which the trigger for block 302 et seq. is not receipt of an RC command at block 300 but rather some other triggering event, because once all components know the identity of the appliance at which the RC is pointed, the RC can send control signals to the intended device via UWB or other medium such as IR or RF. Thus, when the intended and unintended device (202, 204) require different types of remote control codes (or other network based commands), and the appliances convey what type of commands they require to the RC, the RC may send a command using the IR code for the intended device, which may not be recognized by the unintended device.

Allowing a user to address a specific device by physically pointing a remote control at it. The remote control will be able to communicate with any device, thus removing the need for multiple remotes. Intuitively control the intended device by pointing at it.

Optimally, the anchor 212/214 is placed in the appliance 202/204 to be controlled to minimize the power consumption in the RC. In other embodiments, the RC can include a pinging module at each tag that pings a module on an appliance and determines the distance from the appliance module to each tag to execute the relevant steps in FIG. 3, sharing with the appliances 202, 204 the results of the comparison at diamond 308 so that the appliances know which one is being pointed at by the RC.

Furthermore, appliances either before or after the logic of FIG. 3 can identify themselves and their RC command code paradigms to the RC, so that the RC can send the appropriately configured commands to each appliance.

To present an example, supposes that the known distance "d" between the tags 208, 210 of the RC 200 in FIG. 2 is thirty centimeters (30 cm). Suppose further that the first appliance 202 measures the distance to the first tag 208 as being 500 cm and to the second tag 210 as being 530 cm. The difference between the measured differences in this case equals=30 cm, which is the same as the known distance "d" between the tags. This would precipitate a positive test result for the first appliance 202 at diamond 308 in FIG. 3.

On the other hand, suppose that the second appliance 204 measures the distance from the first tag 208 as being 500 cm and to the second tag 210 as being 515 cm. The difference between the measured distances to the tags is only 15 cm, which is not equal to the known distance "d" between the tags. This would precipitate a negative test result for the second appliance 204 at diamond 308 in FIG. 3.

The above methods may be implemented as software instructions executed by a processor, suitably configured application specific integrated circuits (ASIC) or field programmable gate array (FPGA) modules, or any other convenient manner as would be appreciated by those skilled in those art. Where employed, the software instructions may be embodied in a non-transitory device such as a CD ROM or Flash drive. The software code instructions may alternatively be embodied in a transitory arrangement such as a radio or optical signal, or via a download over the internet.

It will be appreciated that whilst present principals have been described with reference to some example embodiments, these are not intended to be limiting, and that various alternative arrangements may be used to implement the subject matter claimed herein.

What is claimed is:

1. An apparatus comprising:
at least one computer memory that is not a transitory signal and that comprises instructions executable by at least one processor to:
transmit a wireless interrogation signal to a companion device;
receive one or more responses to the interrogation signal from the companion device;
based on the one or more responses, determine at least first and second distances;
determine a difference between the first and second distances;
compare the difference to a known distance;
based on the compare, generate one of two binary outputs.

2. The apparatus of claim 1, wherein responsive to the compare indicating that the difference equals the known distance, the instructions are executable to output a first binary output.

3. The apparatus of claim 2, wherein the first binary output is to execute a command from a remote control.

4. The apparatus of claim 2, wherein the compare is determined to indicate that the difference equals the known distance responsive to the difference being within a threshold range of the known distance.

5. The apparatus of claim 1, wherein responsive to the compare indicating that the difference does not equal the known distance, the instructions are executable to output a second binary output.

6. The apparatus of claim 5, wherein the second binary output is to not execute a command from a remote control.

7. The apparatus of claim 5, wherein the compare is determined to indicate that the difference does not equal the known distance responsive to the difference not being within a threshold range of the known distance.

8. The apparatus of claim 1, wherein the known distance is a distance between first and second wireless tags disposed on a remote control (RC).

9. The apparatus of claim 8, wherein the tags are ultra wideband (UWB) tags.

10. The apparatus of claim 8, wherein the tags are arranged in a line parallel to a longitudinal axis of the RC.

11. The apparatus of claim 1, wherein the apparatus is an appliance to be controlled and the companion device is a remote control (RC) configured to send wireless commands to control the appliance.

12. The apparatus of claim 1, wherein the companion device is an appliance to be controlled and the apparatus is a remote control (RC) configured to send wireless commands to control the appliance.

13. A method, comprising:
transmitting a wireless interrogation signal to a companion device;
receiving one or more responses to the interrogation signal from the companion device;
based on the one or more responses, determining at least first and second distances;
determining a difference between the first and second distances;
comparing the difference to a first distance;
based on the comparing, generating one of two binary outputs.

14. The method of claim 13, wherein responsive to the comparing indicating that the difference equals the first distance, the method comprises outputting a first binary output.

15. The method of claim 14, wherein the first binary output is to execute a command from a remote control.

16. The method of claim 14, wherein the comparing is determined to indicate that the difference equals the first distance responsive to the difference being within a threshold range of the distance.

17. The method of claim 13, wherein responsive to the comparing indicating that the difference does not equal the first distance, the method comprises outputting a second binary output.

18. The method of claim 13, wherein the first distance is a distance between first and second wireless tags disposed on a remote control (RC).

* * * * *